United States Patent [19]

Schiel et al.

[11] Patent Number: 4,966,420

[45] Date of Patent: Oct. 30, 1990

[54] AUTOMOTIVE VEHICLE BRAKING UNIT

[75] Inventors: Lothar Schiel, Hofheim; Ralf Jakobi, Liederbach; Juergen Bauer, Wiesbaden, all of Fed. Rep. of Germany

[73] Assignee: Alfred Teves GmbH, Frankfurt am Main, Fed. Rep. of Germany

[21] Appl. No.: 351,978

[22] Filed: May 15, 1989

[30] Foreign Application Priority Data

May 26, 1988 [DE] Fed. Rep. of Germany ....... 3817785

[51] Int. Cl.$^5$ .............................................. B60T 8/32
[52] U.S. Cl. ................................... 303/114; 303/119; 303/DIG. 4; 303/52; 60/545; 60/547.1; 188/356
[58] Field of Search ..................... 303/114, 119, 50-56, 303/DIG. 1-4; 188/356, 357, 181 R, 181 A, 345; 60/545, 547.1

[56] References Cited

U.S. PATENT DOCUMENTS

| | | | |
|---|---|---|---|
| 3,498,682 | 3/1970 | Mueller et al. | 303/114 X |
| 3,827,762 | 8/1974 | Ives | 303/114 |
| 4,790,608 | 12/1988 | Burgdorf et al. | 188/345 X |
| 4,828,337 | 5/1989 | Wagner et al. | 188/356 X |
| 4,900,101 | 2/1990 | Becker et al. | 303/114 X |

Primary Examiner—Douglas C. Butler
Attorney, Agent, or Firm—Robert P. Seitter

[57] ABSTRACT

An anti-locking automotive vehicle braking unit wherein to achieve a reduction of the costs of manufacture and of mounting with an increase of reliability in operation, a pneumatic device (39, 40) is provided for venting of the first power chamber (5) and/or evacuation of the second power chamber (6) of the vacuum brake power booster (1) in the event of a slip control action. This renders the boosting power of the vacuum brake power booster effective or ineffective in a direction opposed to the direction of actuation of the master brake cylinder (2).

16 Claims, 3 Drawing Sheets

AUTOMOTIVE VEHICLE BRAKING UNIT

BACKGROUND OF THE INVENTION

This invention relates to an automotive vehicle braking unit with a vacuum brake power booster arranged between the brake pedal and the master brake cylinder. The braking unit is furnished with at least two power chambers divided from each other by a movable wall. The first one of the power chambers is connectible to a vacuum source and the second chamber is ventable through a control valve actuatable by means of a piston rod coupled with the brake pedal. To generate a boosting power which is proportional to the brake pedal effort, wheel brake cylinders are connected through brake lines to a primary and a secondary pressure chamber of the master brake cylinder. Sensors are associated with the wheels to be braked to detect the rotating behavior of the wheels in order to determine any locking and the output signals of which are transmittable to a central electronic control system. Control signals of the control system control hydraulic fluid inlet and outlet valves which are electromagnetically actuatable and are inserted in the brake lines for the purpose of slip control.

Such a braking unit is known for example from the published German patent application No. 36 27 000. The special feature of this known braking unit operating with an auxiliary hydraulic pressure supply system is that in order to quickly reduce the brake pressure generated by the master brake cylinder in the event of a slip control action. The pistons of the master brake cylinder are furnished with central control valves which open hydraulic fluid connections between a hydraulic fluid reservoir and the pressure chambers of the master brake cylinder in the released position of the brake and which close the hydraulic fluid connections in the applied position of the brake. The brake lines are in connection, through intake lines into which non-return valves are incorporated, with the motor-driven pumps of the auxiliary pressure supply system whose suction connections are linked to the hydraulic fluid reservoir through a suction line.

In the known braking unit, a considerable amount of design effort is required to generate and to control the auxiliary hydraulic pressure, to retain the pistons of the master brake cylinder and to safeguard the braking function in the event of a failure of individual brake circuits.

It is, therefore, an object of the present invention to provide a braking unit in such a manner that an increased reliability in operation is achieved simultaneously with a major reduction of the manufacturing and assembly costs involved. In addition, the pistons of the master cylinder and the brake pedal is to be restored completely after each slip control action. Finally, the braking unit should form a simple anti-locking system.

SUMMARY OF THE INVENTION

According to the present invention, these objects are attained in that pneumatic means are provided which afford venting of the first power chamber and/or evacuation of the second power chamber in the event of a slip control action in order to render the boosting power of the vacuum brake power booster effective or ineffective in a direction opposed to the direction of actuation of the master brake cylinder.

In an advantageous embodiment of the present invention, the pneumatic means are formed by two 2/2-way valves which are energizable by control signals of the central electronic control system. A simplification of the automotive vehicle braking unit is achieved in that the 2/2-way valves are arranged as electromagnetic valves, open when de-energized and closed when de-energized.

In order employ a customary vacuum brake power booster in the automotive vehicle braking unit in accordance with the present invention, it is envisaged according to another preferred embodiment that the pneumatic means are connected to the second power chamber by means of a flange being provided at the booster housing and being furnished with a pneumatic connection and defining a ventable and evacuatable chamber jointly with the booster housing and with a control valve housing. In an advantageous embodiment of the present invention, reliability of functioning is increased in that the control valve housing presents an axial extension which is guided in a sealed manner within the flange.

A particular compact embodiment of the present invention allows manufacture at low cost and is distinguished by the fact that the ventable, respectively evacuatable chamber is separated from the ambient atmosphere by a boot extending between the flange and the piston rod.

BRIEF DESCRIPTION OF THE DRAWING

Further characteristics, advantages and applications of the present invention will now be described in the following detailed description of an embodiment made in reference to the accompanying drawing, in which.

DETAILED DESCRIPTION

Figure 1:
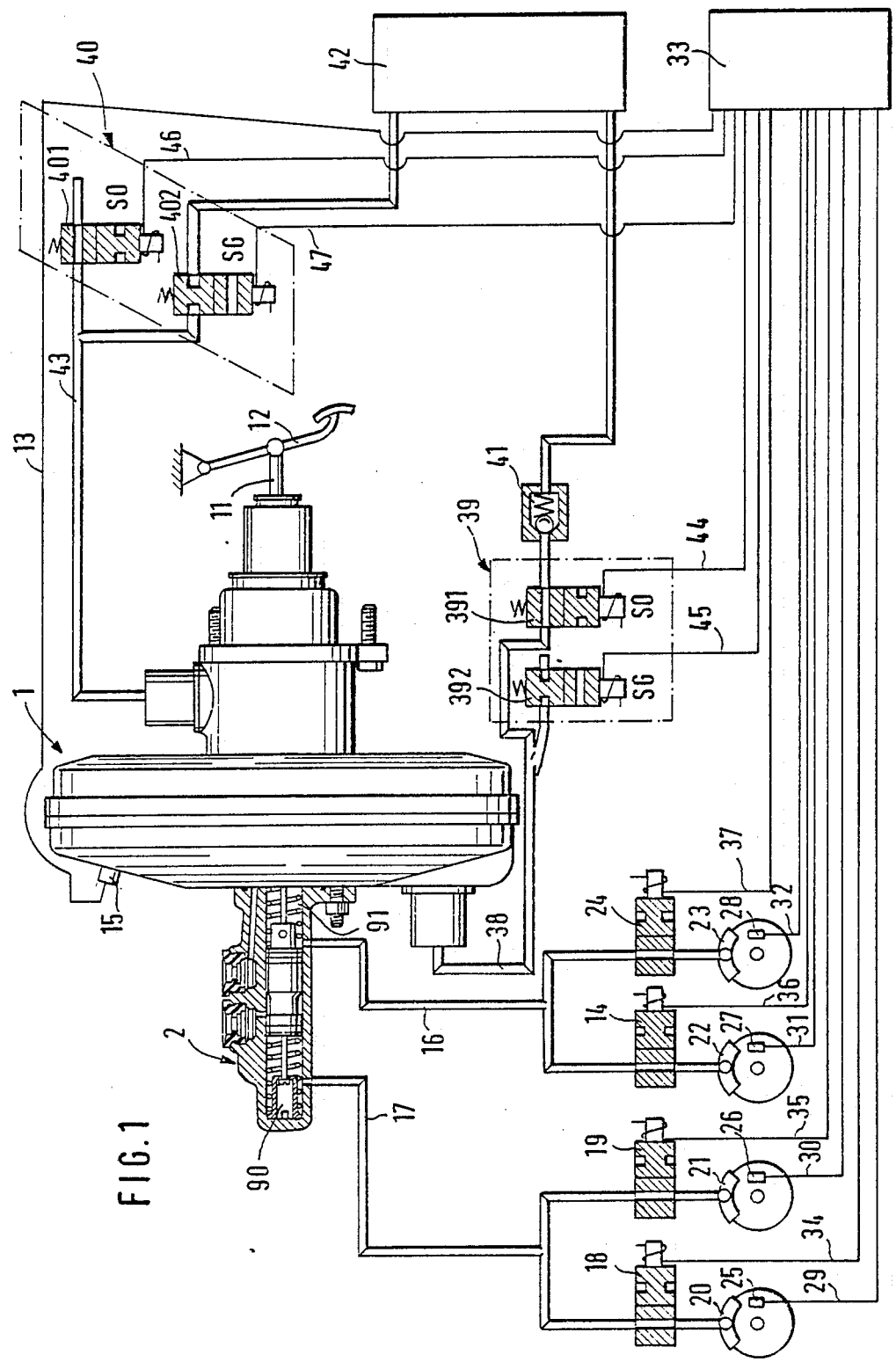
FIG. 1 is a diagrammatic representation of an automotive vehicle braking unit according to the present invention.

In the different Figures of the drawing, identical components bear identical reference numerals. FIG. 1 shows an automotive vehicle braking unit with a vacuum brake power booster 1 which is connected to the brake pedal 12 through a piston rod 11 in a known manner. A tandem master brake cylinder 2 is linked to a brake fluid reservoir (not shown) is positioned on the side of the vacuum brake power booster 1 facing away from the piston rod 11. A first and a second brake circuit 17, 16 are respectively connected to the pressure chambers 80, 90 of tandem master brake cylinder 2.

Through two solenoid valves 18, 19 being provided in the shape of 2/2-way valves, the first brake circuit 17 links the wheel brake cylinders of the two wheel brakes 20, 21 illustrated diagrammatically only to the tandem master brake cylinder 2. In this configuration, each of the two solenoid valves 18, 19 is associated with one of the two wheel brakes 20, 21. The second brake circuit 16 links the wheel brake cylinders of the further two wheel brakes 22, 23 which also are illustrated only diagrammatically to the tandem master brake cylinder 2 through two further solenoid valves 14, 24 which also are configured in the shape of 2/2-way valves.

With each one of the front wheel and rear wheel brakes 20, 21, 22, and 23 a sensor 25, 26, 27, 28 is respectively associated which are connected to a central electronic control system 33 through pertaining signal lines 29, 30, 31, and 32, respectively. Sensors 25, 26, 27, and 28 which may, for example, be provided in the shape of inductive transducers monitor the rotating behavior of the wheels and supply relevant signals over the signal lines 29, 30, 31, and 32, respectively to the electronic control system 33. Electronic control system 33 is linked through control lines 34, 35, 36, 37 to the solenoid valves 18, 19, respectively 14, 24 in order to actuate the latter depending on the signals of the sensors.

Pneumatic means, that is, valve arrangements 39, 40, are connected through pneumatic lines 38, 43 to the vacuum brake power booster 1 which evacuate, or vent power chambers (not shown in detail in the drawing) of the vacuum brake power booster 1 depending on the control signals of the electronic control system 33. The first valve arrangement 39 includes two 2/2-way valves 391, 392 which communicate with the electronic control system 33 by means of control lines 44, 45.

The 2/2-way valve 392 switching the atmosphere is preferably an electromagnetic valve, closed when de-energized while the 2/2-way valve 391 switching the vacuum is an electromagnetic valve which is open when de-energized and whose inlet is connected through a non-return valve 41 to a vacuum source 42.

Also connected to vacuum source 42 is a second vacuum switching 2/2-way valve 402, closed when de-energized and belonging to the second valve arrangement 40 and which is energizable by the central electronic control system 33 through a third control line 47. Finally, second valve arrangement 40 further comprises a second 2/2-way valve 401 switching the atmosphere which is an electromagnetic valve, open when de-energized and is linked to the electronic control system 33 through a fourth control line 46. A pressure sensor 15 whose output signal is transmitted to the central electronic control system 33 over a signal line 13 is connected to one of the two power chambers of the vacuum brake power booster 1.

Figure 2:
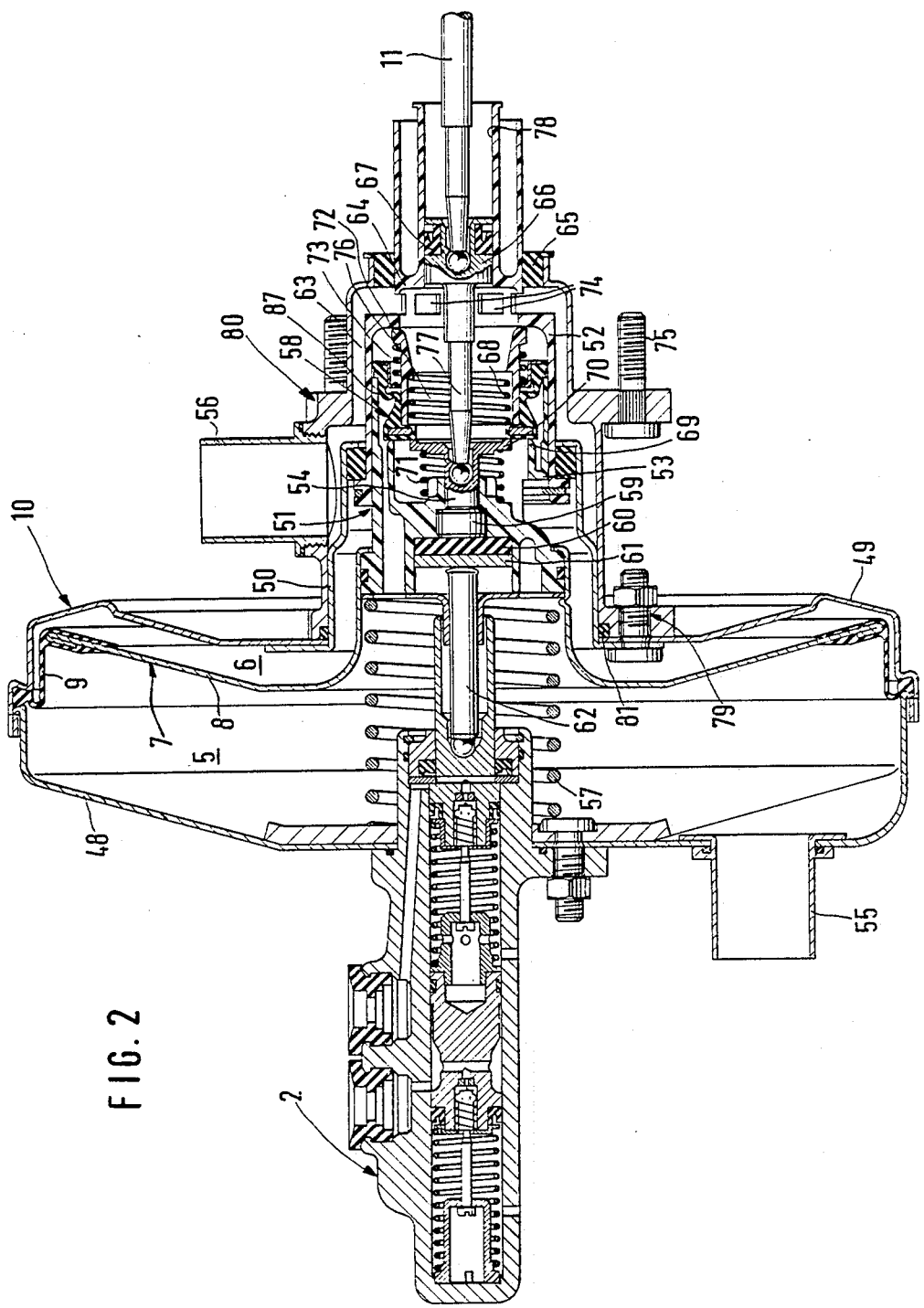
FIG. 2 shows a section through an embodiment of a vacuum brake power booster.

According to FIG. 2, the vacuum brake power booster 1 is provided with two cup-shaped housing elements 48, 49 which are assembled with their open sides and form a booster housing 10. The housing element 48 shown on the left in FIG. 2 is furnished with a pneumatic connection 55 rigidly connected with the tandem master brake cylinder 2. The housing element 49 shown on the right presents a central guide branch 50 which slidingly and vacuum-tightly retains a control valve housing 51 of the vacuum brake power booster 1. Control valve housing 51 is provided with a rear control housing part 52 which projects from the vacuum brake power booster 1 in the direction of the brake pedal 12 and a front control housing part 53 is accommodated within the vacuum brake power booster 1.

The interior space of the booster housing 10 is divided, by means of a movable wall 7 arranged therein, and comprises a diaphragm disc 8 and a rolling diaphragm 9 adhering to the latter, into a first power chamber 5 and a second power chamber 6 which is vented in the event of a normal braking action by means of a valve arrangement 58 disposed within the control valve housing 51. The valve arrangement 58 is actuated by a valve piston 54 connected to the piston rod 11. The valve piston 54 transmits the actuating force introduced by the brake pedal 12 through a transmission disc 59, a high-elasticity reaction disc 60 and a pressure plate 61 to a power output member, that is, to a push rod 62. A return spring 57 is inserted between the anterior housing element 48 and the diaphragm disc 8 is provided for the purpose of restoring the movable wall 7.

A flange 80 is fastened to the brake pedal-side housing element 49 of the booster housing 10 by means of screwed joints 79 with an interposed seal 81. Flange 80 presents a pneumatic connection 56 to which the pneumatic line 43 coming from the second valve arrangement 40 is connected. The rear control housing part 52 is preferably furnished with an axial extension 64 which is axially guided within the flange 80 and simultaneously sealed therein by means of a sealing ring 65. Flange 80 bearing fixation elements 75 for a wall of the body of an automotive vehicle defines, jointly with the rear control housing part 52, a pneumatic chamber 63 which is ventable, respectively evacuatable depending on the control signals given by the central electronic control system 33.

The transmission zone between rear control housing part 52 and its axial extension 64 is provided with radial openings 74 in order to admit the pneumatic pressure ruling within the chamber 63 to the interior space 76 of the valve arrangement 58 accomodated within the control valve housing 51.

Valve arrangement 58 comprises a first sealing seat 69 which is arranged at the front control housing part 53, of a second sealing seat 70 which is arranged at the valve piston 54 and of a poppet valve 87 which is biased in the closing direction by means of a valve spring 68 actuated directly by an intermediate rod 77. The pedal-side end of rod 77 is formed with a guide collar 66 which is guided in a bore 78 being provided in the axial extension 64. A sealing sleeve 67 sliding on the wall of the bore 78 provides sealing of guide collar 66, while the piston rod 11 coupled to the brake pedal 12 takes support at the pedal-side end of said intermediate rod 77. The poppet valve 87 is guided within the control valve housing 51 by means of a guide element 72 taking support at the rear control housing part 52 and at which a compression spring 73 takes support pretensioning the outer edge of the poppet valve 87 in the direction of the front control housing part 53. Between the valve piston 54 and the front control housing part 53 a piston return spring 71 is arranged which determines the force of response of vacuum brake power booster 1.

Figure 3:
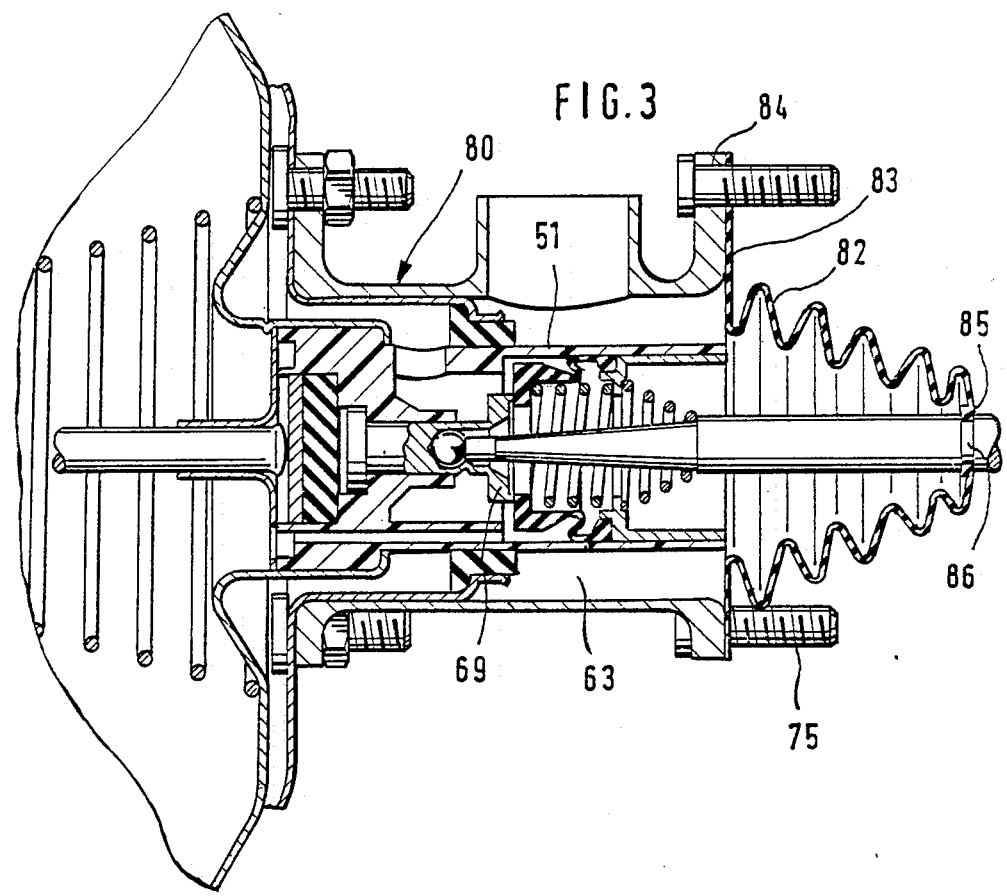
FIG. 3 is a partial illustration of a second embodiment of the vacuum brake power booster in accordance with the present invention in an axial cross section; and, FIG. 4 is a diagrammatic representation of the functioning of the inventive automotive vehicle braking unit in the event of a slip control action.

The control assembly illustrated in FIG. 3 is distinguished from that shown in FIG. 2 in that the control valve housing 51 is arranged in one part only, with the first sealing seat 69 being located, in the released position of the vacuum brake power booster 1, at a distance from the poppet valve 87, the distance being the lost travel of the device. The ventable, respectively evacuatable chamber 63 is sealed off toward the outside by means of a boot 82 being fixed to the flange 80 and whose radial ranges of fixation 83 configurated symmetrically opposite each other interact with the fixation elements 75 in the sense that fixation elements 75 extend through passage openings 84 arranged in the ranges of fixation 83 in order to be screwed or bolted to a wall of the body of the automotive vehicle during assembly. At its end facing away from the flange 80 boot 82 is formed with a torus 85 which is inserted in a radial groove 86 formed in the piston rod 11.

The method of operation of functioning of the automotive vehicle braking unit in accordance with the present invention as illustrated in the drawing is described in the following:

When the brakes are in the released position, that is, in the non-actuated condition of the vacuum brake power booster 1, the two power chamber 5, 6 are in the evacuated condition, so that identical pressure conditions exist within them. Evacuation of the master cylinder-side power chamber 5 is carried out by means of the vacuum source 42, through 2/2-way valve 391, open when de-energized, whereas evacuation of the pedal-side power chamber 6 is effected through the control valve 58. The ventable, respectively evacuatable chamber 63 is subjected to the atmospheric pressure which is conveyed over the pneumatic line 43 and the 2/2-way valve 401, open when de-energized.

Now, when the brake pedal 12 is actuated during braking, then due to the resulting effort the piston rod 11 together with the valve piston 54 will be slid to the left, as a result of which the control valve 58 will be actuated. As a result, a pressure differential proportional to the foot effort will be applied to the movable wall 7, which generates a boosting power which is added to the pedal effort and transmitted through the push rod 62 to the primary piston of the master brake cylinder 2 in order to build up a hydraulic pressure in the two pressure chambers. This is conveyed through the brake circuits 16 and 17 forth to the individual wheel brakes 20, 21, 22, and 23. Actuation and release of the brakes, thus, takes place in the same way as with known vacuum brake power booster.

Figure 4:
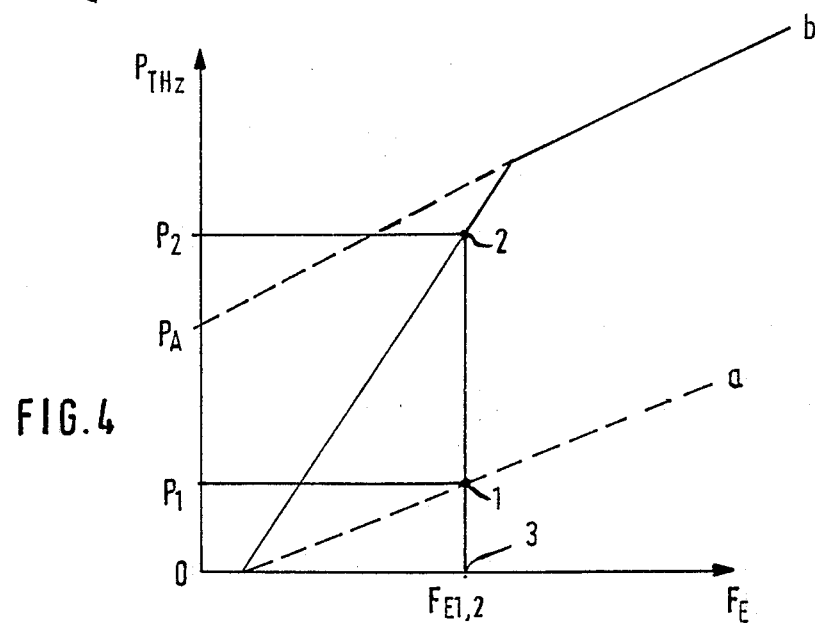

If and when during a braking action locking of the associated wheel is detected by one or by a plurality of the sensors 25, 26, 27, 28, then the pressure which has built up in the master brake cylinder 2 is reduced at least partly. In the following, it is assumed that the force acting on the brake pedal 12 remains constant. This condition is illustrated by point 2 in the graph according to FIG. 4, in which the curve a shows the relationship illustrated in the graph *without* and the curve b shows that same relationship *with* the boosting power of the vacuum brake power booster 1. After the aforementioned locking tendency has been signalled to the central electronic control system 33 by one of the sensors, central electronic control system 33 will generate change-over signals which cause a simultaneous change-over of the two 2/2-way valves 391, 392 of the first valve arrangement 39 and, as a consequence, the master brake cylinder-side power chamber 5 of the vacuum brake power booster 1 to be vented. Since no pressure differential will now act on the movable wall 7 (the brake pedal-side power chamber 6 continues to be subjected to the atmospheric pressure), the boosting power so determined will, therefore, disappear. The described elimination of the boosting power has, therefore, the consequence of a pressure reduction within the master brake cylinder 2 (point 1 in the graph in FIG. 4). After the complete venting of the master brake cylinder-side power chamber 5, the pressure sensor 15 will signal to the central electronic control system 33 that only a change-over of the second valve arrangement 40 need be carried out for a further pressure reduction.

If and when the pressure in the master brake cylinder is to be eliminated completely (point 3), then the 2/2-way valves 401, 402 of the second valve arrangement 40 will be changed over. By the evacuation of the pneumatic chamber 63, respectively of the brake pedal-side power chamber 6 a boosting power acting in contrast to the foot effort brought to bear on the brake pedal 12 will come about at the movable wall 7 which brings about a complete reduction of the output power of the vacuum brake power booster 1, respectively of the hydraulic pressure existing in the master brake cylinder 2. A slip control phase taking place is signalled to the driver directly by a pulsation of the brake pedal.

What is claimed is:

1. An automotive vehicle braking unit with a vacuum brake power booster being arranged between the brake pedal and the master brake cylinder and furnished with at least two power chambers being divided from each other by a movable wall, the first one of said power chambers being connectible to a vacuum source and the second one being ventable through a control valve actuatable by means of a piston rod coupled with the brake pedal in order to generate a boosting power which is proportional to the brake pedal effort, wheel brake cylinders being connected through brake lines to a primary and a secondary pressure chamber of the master brake cylinder, with sensors associated with the wheels to be braked and detecting the rotating behavior of the wheels in order to determine any locking and whose output signals are transmittable to a central electronic control system by whose control signals hydraulic fluid inlet and outlet valves are controllable which are electromagnetically actuatable and are inserted in the brake lines for the purpose of slip control, wherein pneumatic means (39, 40) are provided which provide venting of the said first power chamber (5) and evacuation of said second power chamber (6) in the event of a slip control action in order to control the boosting power of the said vacuum brake power booster (1) in a direction opposed to the direction of actuation of said master brake cylinder (2) and means including a plurality of electromagnetic valves for respectively connecting the first and second power chambers alternately to one of said vacuum source and the atmosphere.

2. An automotive vehicle braking unit as claimed in claim 1, wherein a pressure sensor (15) whose output signal is transmittable to said central electronic control system (33) is connected to one of the two said power chambers (5, 6).

3. An automotive vehicle braking unit with a vacuum brake power booster being arranged between the brake pedal and the master brake cylinder and furnished with at least two power chambers being divided from each other by a movable wall, the first one of said power chambers being connectible to a vacuum source and the second one being ventable through a control valve actuatable by means of a piston rod coupled with the brake pedal in order to generate a boosting power which is proportional to the brake pedal effort, wheel brake cylinders being connected through brake lines to a primary and a secondary pressure chamber of the master brake cylinder, with sensors associated with the wheels to be braked and detecting the rotating behavior of the wheels in order to determine any locking and whose output signals are transmittable to a central electronic control system by whose control signals hydraulic fluid inlet and outlet valves are controllable which are electromagnetically actuatable and are inserted in the brake lines for the purpose of slip control, wherein pneumatic means (39, 40) are provided which provide venting of the said first power chamber (5) and evacuation of said second power chamber (6) in the event of a slip control action in order to control the boosting power of the said vacuum brake power booster (1) in a direction opposed to the direction of actuation of said master brake cylinder (2); and, wherein said pneumatic means (39, 40) are each formed by two 2/2-way valves (391, 392, respectively 401, 402) which are energizable by control signals of said central electronic control system (33).

4. An automotive vehicle braking unit as claimed in claim 3, wherein said 2/2-way valves (391, 392, 401, 402) are arranged as electromagnetic valves, open when de-energized (391, 401) and closed when de-energized (392, 402).

5. An automotive vehicle braking unit with a vacuum brake power booster being arranged between the brake pedal and the master brake cylinder and furnished with at least two power chambers being divided from each other by a movable wall, the first one of said power chambers being connectible to a vacuum source and the second one being ventable through a control valve actuatable by means of a piston rod coupled with the brake pedal in order to generate a boosting power which is proportional to the brake pedal effort, wheel brake cylinders being connected through brake lines to a primary and a secondary pressure chamber of the master brake cylinder, with sensors associated with the wheels to be braked and detecting the rotating behavior of the wheels in order to determine any locking and whose output signals are transmittable to a central electronic control system by whose control signals hydraulic fluid inlet and outlet valves are controllable which are electromagnetically actuatable and are inserted in the brake lines for the purpose of slip control, wherein pneumatic means (39, 40) are provided which provide venting of the said first power chamber (5) and evacuation of said second power chamber (6) in the event of a slip control action in order to control the boosting power of the said vacuum brake power booster (1) in a direction opposed to the direction of actuation of said master brake cylinder (2); wherein said pneumatic means (39, 40) are each formed by two 2/2-way valves (391, 392, respectively 401, 402) which are energizable by control signals of said central electronic control system (33); and wherein said pneumatic means (39, 40) are each formed by one electromagnetic 3/2-way valve being connected to one each of said two power chambers (5, respectively 6).

6. An automotive vehicle braking unit as claimed in claim 5, wherein said pneumatic means (40) are connected to said second power chamber (6) by means of a flange (80) being provided at the booster housing (10) and being furnished with a pneumatic connection (56) and defining a ventable and evacuatable chamber (63) jointly with said booster housing (10) and with a control valve housing (51).

7. An automotive vehicle braking unit as claimed in claim 6, wherein said flange (80) bears fixation elements (75) for a wall of the vehicle body.

8. An automotive vehicle braking unit as claimed in claim 7, wherein said control valve housing (51) presents an axial extension (64) which is guided in a sealed manner within the said flange (80).

9. An automotive vehicle braking unit as claimed in claim 8, wherein said axial extension is fromed with a bore (78) in which a guide collar (66) of an intermediate rod (77) directly actuating the control valve (58) is slidably guided in a sealed manner, which said guide collar (66) is in active connection with the piston rod (11).

10. An automotive vehicle braking unit as claimed in claim 9, wherein said axial extension (64) is arranged as forming one piece with said control valve housing (51, respectively 52), openings (74) being provided in the transition range between said control valve housing (52) and the said extension (64) which afford to pneumatically subject the interior space (76) of said control valve (58) to the pressure ruling within said chamber (63).

11. An automotive vehicle braking unit as claimed in claim 9, wherein said guide collar (66) is sealed with respect to the wall of said bore (78) by means of a sealing sleeve (67).

12. An automotive vehicle braking unit as claimed in claim 7, wherein said flange (80) is fastened to said booster housing (10) by means of screwed joints (79), with a seal (81) being interposed.

13. An automotive vehicle braking unit as claimed in claim 7, wherein said chamber (63) is sealed off toward the ambient atmosphere by means of a boot (82) extending between said flange (80) and said piston rod (11).

14. An automotive vehicle braking unit as claimed in claim 13, wherein said boot (82) is formed with at least two radial ranges of fixation (83) arranged symmetrically opposite each other and interacting with said fixation elements (75) provided at said flange (80).

15. An automotive vehicle braking unit as claimed in claim 14, wherein said ranges of fixation (83) present passage openings (84) for said fixation elements (75).

16. An automotive vehicle braking unit as claimed in claim 15, wherein at its end facing away from said flange (80) said boot (82) is formed with a torus (85) which is insertable in a radial groove (86) arranged in said piston rod (11).

* * * * *